(12) United States Patent
Gilbert et al.

(10) Patent No.: US 7,248,152 B2
(45) Date of Patent: Jul. 24, 2007

(54) AUTOMATIC ON/OFF SWITCH FOR VEHICLE POWER OUTLETS

(75) Inventors: Jason Gilbert, Loxahatchee, FL (US); David L. Brown, Jupiter, FL (US)

(73) Assignee: XM Satellite Radio, Inc., Washington, DC (US)

( * ) Notice: Subject to any disclaimer, the term of this patent is extended or adjusted under 35 U.S.C. 154(b) by 189 days.

(21) Appl. No.: 11/035,854

(22) Filed: Jan. 14, 2005

(65) Prior Publication Data

US 2006/0164223 A1 Jul. 27, 2006

(51) Int. Cl.
B60R 25/10 (2006.01)
G08B 21/00 (2006.01)
H02H 7/18 (2006.01)

(52) U.S. Cl. ............ 340/428; 340/426.34; 340/636.1; 340/693.1; 340/693.4; 307/10.1; 307/10.7; 307/150; 320/135; 323/284

(58) Field of Classification Search ................. 340/428
See application file for complete search history.

(56) References Cited

U.S. PATENT DOCUMENTS

| | | | |
|---|---|---|---|
| 4,736,145 A * | 4/1988 | Sakurai et al. ............. 318/563 |
| 4,905,115 A * | 2/1990 | Whidden et al. ............. 361/92 |
| 5,060,300 A | 10/1991 | Luber et al. |
| 5,200,877 A * | 4/1993 | Betton et al. ................. 361/92 |
| 5,524,051 A | 6/1996 | Ryan |
| 5,929,604 A * | 7/1999 | Irvin ........................... 320/136 |
| 6,133,871 A | 10/2000 | Krasner |
| 6,222,484 B1 | 4/2001 | Seiple et al. |
| 6,223,025 B1 | 4/2001 | Tsukuda |
| 6,330,463 B1 | 12/2001 | Hedrich |
| 6,337,719 B1 | 1/2002 | Cuccia |
| 6,353,747 B1 | 3/2002 | Honda |
| 6,588,015 B1 | 7/2003 | Eyer et al. |
| 2002/0049879 A1 | 4/2002 | Eyer |

* cited by examiner

Primary Examiner—Donnie L. Crosland
(74) Attorney, Agent, or Firm—Pablo Meles; Akerman Senterfitt

(57) ABSTRACT

A vehicle power outlet switch (10) can include a threshold detector (14) for comparing a predetermined threshold with a vehicle battery characteristic and a power switch (18) controlled by the output of the threshold detector. Note, the vehicle battery characteristic differs while the vehicle engine is turned on or turned off and the threshold detector provides an enabling signal to the power switch when the vehicle engine is detected as being on. The threshold detector can also provide a disabling signal to the power switch when the vehicle engine is off. The power outlet switch can further include a timer (16) coupled to an output of the threshold detector that continues to provide an enabling signal to the power switch for a predetermined time after the threshold detector detects that the vehicle engine is turned off. The timer can include or be a one shot timer.

19 Claims, 3 Drawing Sheets

10

20

AUTOMATIC ON/OFF SWITCH FOR VEHICLE POWER OUTLETS

FIELD OF THE INVENTION

The invention relates generally to a method and apparatus for preventing power drainage in a vehicle battery, and more particularly to a method and apparatus for limiting power usage when a vehicle engine is turned off and for enabling power when the vehicle engine is turned on.

BACKGROUND OF THE INVENTION

Automobiles and other transportation vehicles have typically included a cigarette lighter receptacle that can be used to supply power to accessory device. Some of the accessory devices that can be connected to the cigarette lighter receptacle include radios, cellular telephones, notebook computers, DC to AC inverters, etc.

More recently, automobile manufacturers started adding additional cigarette lighter sockets and labeled them "Accessory Power". These receptacles are switched off when the key to the vehicle is not in an "Accessory" or "ON" position. This alleviates the problem of battery drain that can occur when an occupant of the vehicle plugs a device into the receptacle and then removes the keys and leaves the vehicle. Without a switchable "Accessory Power" receptacle, the receptacle would continue to supply power allowing an accessory device to drain the vehicle battery. Although, the "Accessory Power" receptacle solves the battery problem with some newer vehicles, there are many older vehicles on the road and still new vehicles that don't disable the power to the receptacles.

SUMMARY OF THE INVENTION

Embodiments in accordance with the present invention can provide a system, circuit, and method that can adapt "non-switchable" cigarette lighter receptacles and "accessory power" receptacles to an automatic switchable receptacle that does not require user intervention.

In a first embodiment in accordance with the present invention, a vehicle power outlet switch can include a threshold detector for comparing a predetermined threshold with a vehicle battery characteristic and a power switch controlled by the output of the threshold detector. Note, the vehicle battery characteristic differs while the vehicle engine is turned on and while the vehicle engine is turned off and the threshold detector provides an enabling signal to the power switch when the vehicle engine is detected as being on. The threshold detector can also provide a disabling signal to the power switch when the vehicle engine is off. The power outlet switch can further include a timer coupled to an output of the threshold detector that continues to provide an enabling signal to the power switch for a predetermined time after the threshold detector detects that the vehicle engine is turned off. The timer can be a one shot timer or can include a one shot timer. The vehicle power outlet switch can further include a switch coupled to the timer that enables the timer to provide the enabling signal to the power switch for the predetermined time when the vehicle engine is turned off. Note, the predetermined threshold can range between 12 volts and 14.2 volts. Alternatively, the predetermined threshold can be a calculated voltage that is derived from the voltages obtained when the engine is turned on and when the engine is turned off. The vehicle power outlet switch can further include an indicator coupled to the timer that indicates when the power switch is enabled. The indicator can be a visual indicator such as an light emitting diode (LED) or an audible indicator. Note, the vehicle power outlet switch can also include a threshold generator providing the predetermined threshold to the threshold detector, wherein the threshold generator is coupled to a vehicle battery as an input when the vehicle power outlet switch is connected to a vehicle power outlet.

In a second embodiment in accordance with the present invention, a vehicle cigarette lighter outlet switching circuit can include a threshold detector for comparing a predetermined threshold with a vehicle battery voltage, an on timer that provides an enabling switch control signal at an output when the threshold detector detects the vehicle engine is on, and a power switch controlled by the output of the on timer. Note, the vehicle battery voltage differs while the vehicle engine is turned on and while the vehicle engine is turned off. The predetermined threshold can range between just above 12 volts and 14.2 volts while the battery voltage remains around 12 volts when the car vehicle is off. The predetermined threshold can be a calculated voltage that is derived from the voltages obtained when the engine is turned on and when the engine is turned off. The threshold detector provides a disabling signal to the power switch when the vehicle engine is off and the on timer can continue to provide an enabling signal to the power switch for a predetermined time after the threshold detector detects that the vehicle engine has been turned off. The vehicle cigarette lighter outlet switching circuit can further include a switch coupled to the on timer that enables a one shot timer included within the on timer to provide the enabling signal to the power switch for the predetermined time when the vehicle engine is turned off. The vehicle power outlet switch can further include an indicator coupled to the on timer that indicates when the power switch is enabled. Note, the vehicle cigarette lighter outlet switching circuit can form a part of at least one among a power cord for an external electronic accessory or the external electronic accessory itself.

In a third embodiment in accordance with the present invention, a method of preventing a vehicle battery from draining when plugged to an external electronic accessory can include the steps of measuring a battery voltage at a non-switchable cigarette lighter receptacle, comparing the battery voltage with a predetermined battery voltage to determine when a vehicle engine is off and when a vehicle engine is on, and enabling a power switch external to the non-switchable cigarette lighter receptacle when the vehicle engine is on and disabling the power switch when the vehicle engine if off.

DETAILED DESCRIPTION OF THE DRAWINGS

Figure 1:
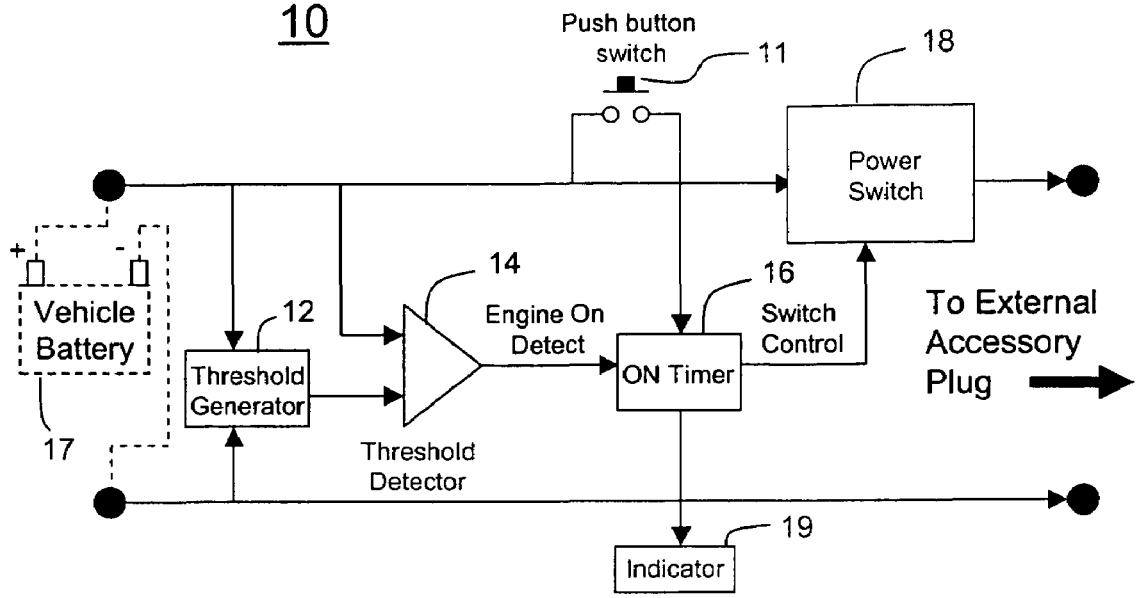
FIG. 1 is a simplified circuit diagram of a vehicle power outlet switch in accordance with an embodiment of the present invention.

Referring to FIG. 1, a basic circuit block diagram is shown of a vehicle power outlet switch 10 in accordance with an embodiment of the invention. From left to right, the switch 10 includes a threshold generator circuit 12 that generates a fixed or nominal voltage between the run and stop voltages of the engine, such voltage can typically range between 12 volts and 14.2 since a vehicle battery 17 is usually 12 volts. Next a comparator or threshold detector 14 detects if the actual cigarette lighter receptacle voltage is above or below the threshold voltage. If the incoming cigarette lighter receptacle voltage is greater than the comparator voltage, an Engine On Detect signal is true. If the voltage is lower than the threshold voltage, the Engine On Detect signal is false. The Engine On Detect signal is fed to an ON Timer 16. The ON Timer 16 can contain a One-Shot timer that can be restarted at any time. The ON Timer 16 can contain a time constant that is either programmable by the end user, or a predetermined fixed time interval. The ON Timer 16 can be retriggered in one of two methods. First, if the Engine On Detect signal is true, then the ON Timer 16 remains in a retriggered mode and the timer does not begin until the Engine On Detect signal returns to a false state, keeping a power switch 18 energized. Second, any time a push button switch 11 coupled to the ON Timer 16 is depressed, the ON Timer 16 is restarted keeping the power switch 18 energized. Once the ON Timer 16 time expires, the power switch 18 is de-energized and power is removed from the attached accessory. The ON Timer 16 can also have a connection to a visible or audible indicator 19. The indicator 19 may optionally be activated when the ON Timer 16 is within a predetermined time of expiring. This alerts the user that they may either start the vehicle or depress the push button 11 to restart the timer again.

Figure 2:
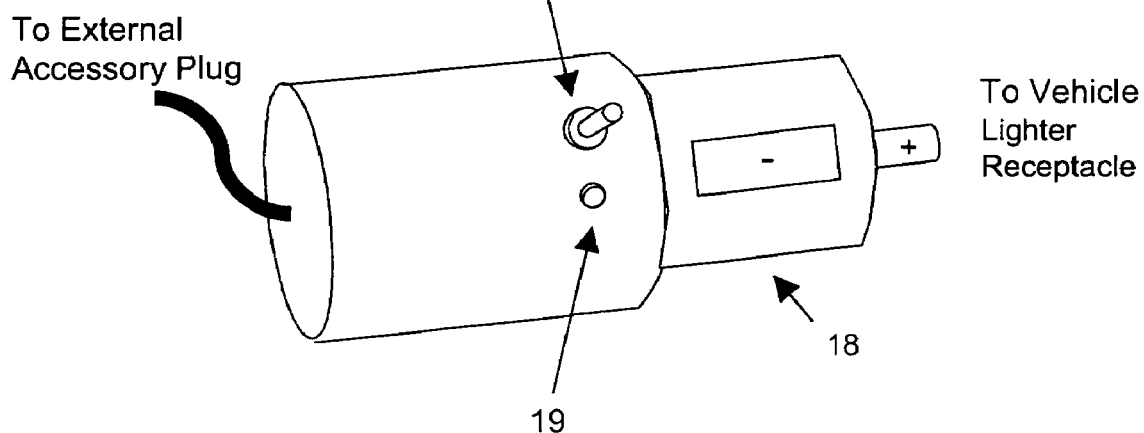
FIG. 2 is a schematic diagram of a mechanical version of the vehicle power outlet switch in accordance with an embodiment of the present invention.

Note, the Power switch 18 can be an electromechanical (relay) or semiconductor (Transistor) device that can enable and disable the flow of DC power from the existing cigarette lighter receptacle (not shown) to the accessory device that is connected to this circuit. Again, the accessory device can be any portable electronic device such as a cell phone, radio, laptop or DVD player for example that can use power from a cigarette lighter receptacle. The vehicle power outlet switch 10 can be part of a power cord or plug 20 as shown in FIG. 2 or alternatively, the vehicle power outlet switch 10 can be incorporated into the electronic accessory device itself. The plug 20 can include all of the interconnects, buttons, and indicators as previously described with respect to FIG. 1. The plug 20 can plug into a vehicle's cigarette lighter receptacle on one end and couple to an accessory device on another end. The circuitry of the vehicle power outlet switch 10 can be contained within the plug 20, including the power switch 18, push button 111 and indicator 19 as shown. The diagram shows an LED as an indicator, but an audible indicator could also be included.

Figure 3:
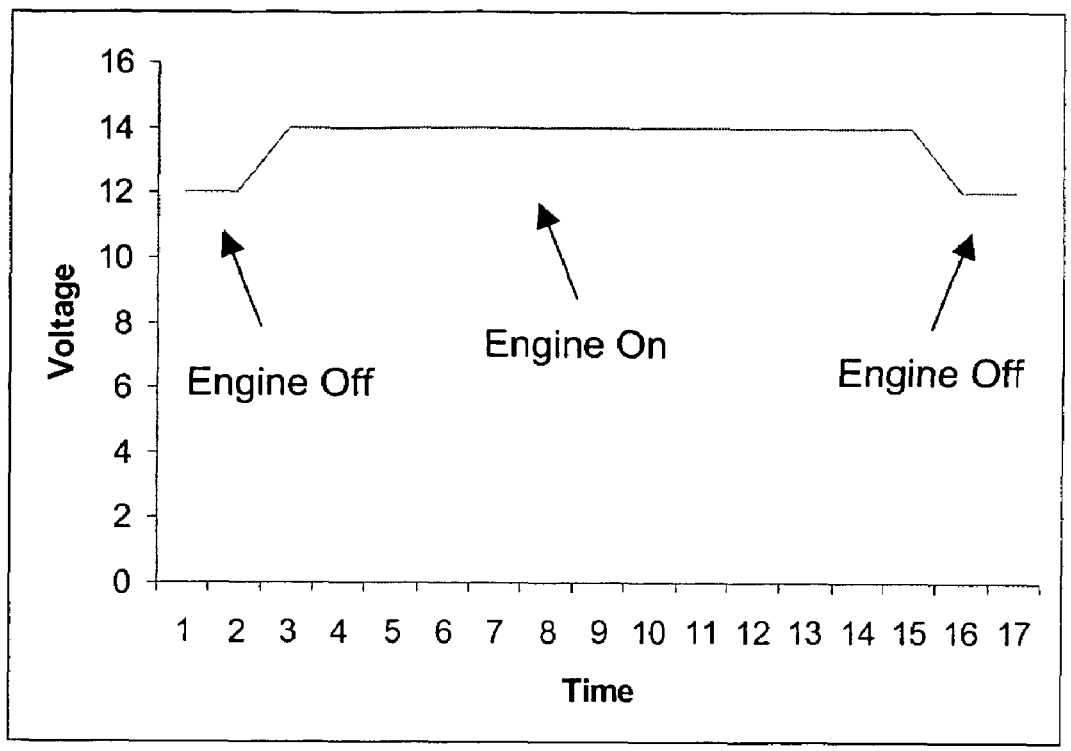
FIG. 3 is a timing diagram of a vehicle battery voltage while an engine is on and off in accordance with an embodiment of the present invention.
Figure 4:
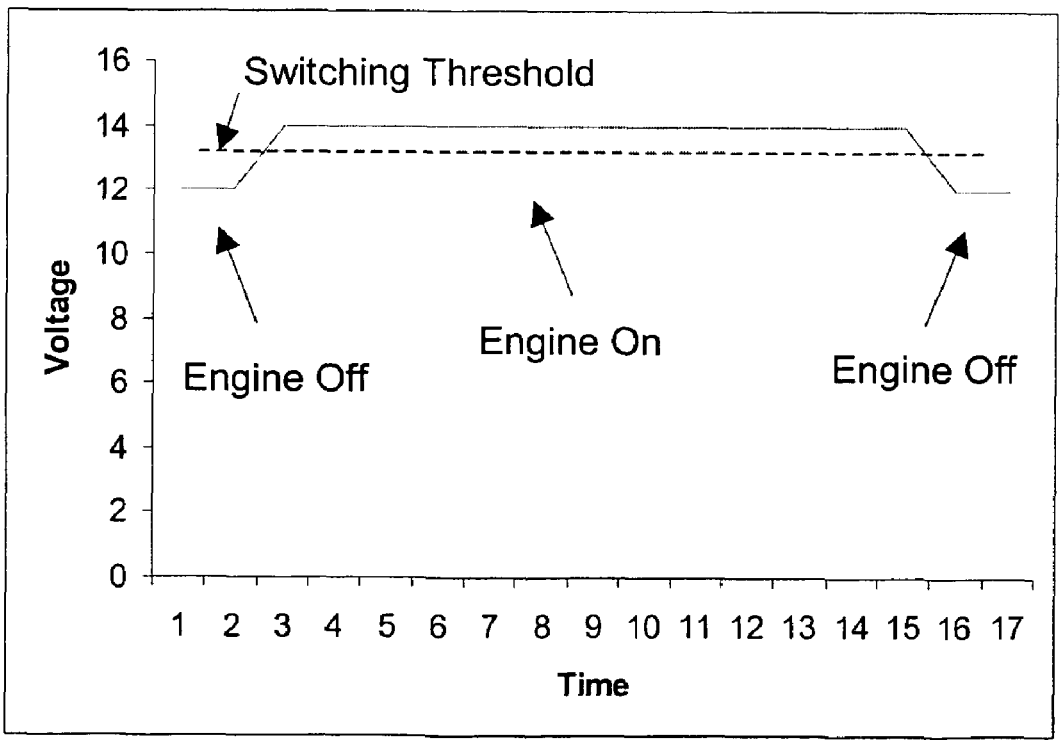
FIG. 4 is the timing diagram of the vehicle battery voltage of FIG. 3, further illustrating a predetermined switching threshold voltage in accordance with an embodiment of the present invention.

Based on the electrical system of most vehicles built in the United States and foreign countries, the electrical system supplies approximately 12VDC to a cigarette lighter receptacle when the motor is not running in the vehicle. When the vehicle motor is running, the output voltage at the cigarette lighter ranges from 13.8 VDC to 14.2 VDC. The voltage fluxuation is shown in the timing diagram of FIG. 3. A switching threshold that is between 12 volts and 14.2 volts is further illustrated in FIG. 4. Thus, embodiments herein detect the difference in operating voltage at the cigarette lighter contacts and disable an attached electronic accessory from consuming power when the engine is turned off. Conversely, embodiments herein will automatically apply power to the accessory when engine is detected as being on based on the detection of a voltage at or in excess of the threshold voltage. Note, although the a threshold can be set based on the voltage ranges noted above, actual voltage ranges may vary from vehicle to vehicle and battery to battery. Accordingly, embodiments herein can also include a programmable threshold generator that can set an appropriate predetermined threshold based on voltages measured when the engine is on and when it is turned off.

Figure 5:
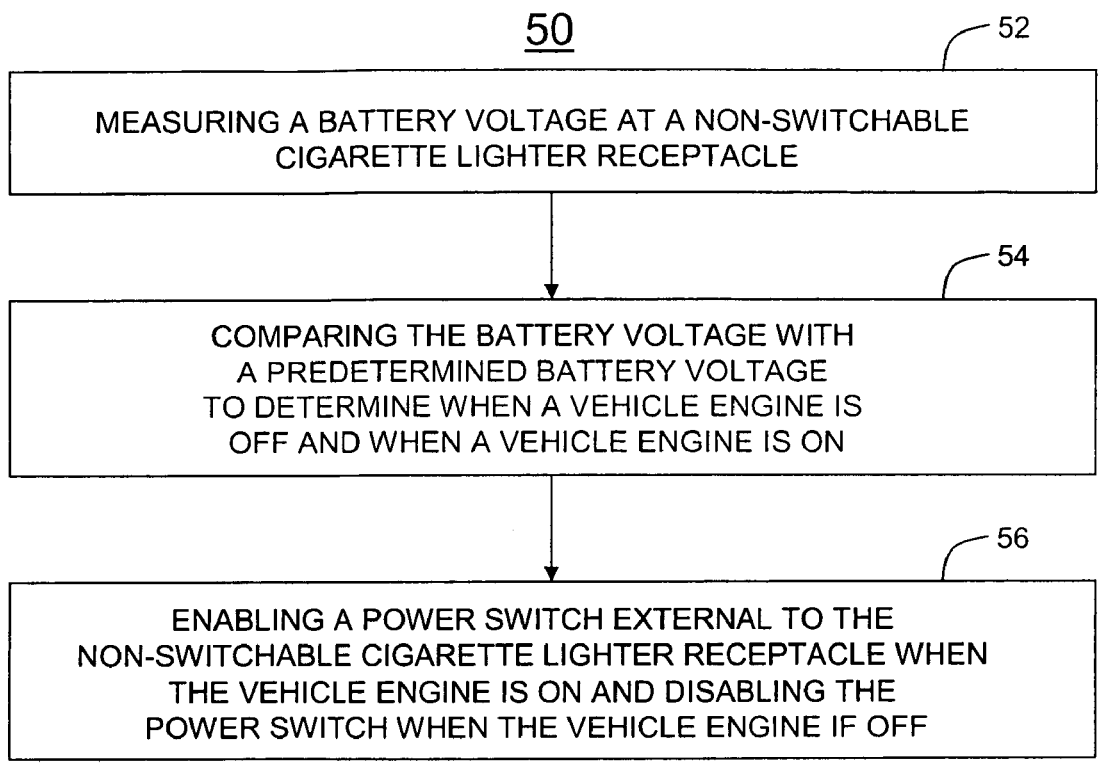
FIG. 5 is a flow chart illustrating a method of preventing a vehicle battery from draining when plugged to an external electronic accessory in accordance with an embodiment of the present invention.

Referring to FIG. 5, a method 50 of preventing a vehicle battery from draining when plugged to an external electronic accessory can include the step 52 of measuring a battery voltage at a non-switchable cigarette lighter receptacle, comparing the battery voltage with a predetermined battery voltage to determine when a vehicle engine is off and when a vehicle engine is on at step 54, and enabling a power switch external to the non-switchable cigarette lighter receptacle when the vehicle engine is on and disabling the power switch when the vehicle engine if off at step 56.

The description above is intended by way of example only and is not intended to limit the present invention in any way except as set forth in the following claims.

We claim:

1. A vehicle power outlet switch, comprising:
   a threshold detector for comparing a predetermined threshold with a vehicle battery characteristic, wherein the vehicle battery characteristic differs while the vehicle engine is turned on and while the vehicle engine is turned off;
   a power switch controlled by the output of the threshold detector, wherein the threshold detector provides an enabling signal to the power switch when the vehicle engine is detected as being on;
   a timer coupled to an output of the threshold detector that continues to provide an enabling signal to the power switch for a predetermined time after the threshold detector detects that the vehicle engine is turned off.

2. The vehicle power outlet switch of claim 1, wherein the threshold detector provides a disabling signal to the power switch when the vehicle engine is off.

3. The vehicle power outlet switch of claim 1, wherein the vehicle power outlet switch further comprises a threshold generator providing the predetermined threshold to the threshold detector, wherein the threshold generator is coupled to a vehicle battery as an input when the vehicle power outlet switch is connected to a vehicle power outlet.

4. The vehicle power outlet switch of claim 1, wherein the vehicle power outlet switch further comprises a switch coupled to the timer that enables the timer to provide the enabling signal to the power switch for the predetermined time when the vehicle engine is turned off.

5. The vehicle power outlet switch of claim 1, wherein the timer is a one shot timer.

6. The vehicle power outlet switch of claim 1, wherein the predetermined threshold is a range between 12.1 volts and 15 volts.

7. The vehicle power outlet switch of claim 1, wherein the predetermined threshold is a range between 13.8 volts and 14.2 volts.

8. The vehicle power outlet switch of claim 1, wherein the predetermined threshold is a calculated voltage that is derived from the voltages obtained when the engine is turned on and when the engine is turned off.

9. The vehicle power outlet switch of claim 1, wherein the vehicle power outlet switch further comprises an indicator coupled to the timer that indicates when the power switch is enabled.

10. The vehicle power outlet switch of claim 9, wherein the indicator is selected among a visual indicator and an audible indicator.

11. A method of preventing a vehicle battery from draining when plugged to an external electronic accessory, comprising the steps of:
  measuring a battery voltage at a non-switchable cigarette lighter receptacle;
  comparing the battery voltage with a predetermined battery voltage to determine when a vehicle engine is off and when a vehicle engine is on; and
  enabling a power switch external to the non-switchable cigarette lighter receptacle when the vehicle engine is on and disabling the power switch when the vehicle engine if off, wherein the power switch continues to be enabled for a predetermined time after determining that the vehicle engine is turned off.

12. A vehicle cigarette lighter outlet switching circuit, comprising:
  a threshold detector for comparing a predetermined threshold with a vehicle battery voltage, wherein the vehicle battery voltage differs while the vehicle engine is turned on and while the vehicle engine is turned off;
  an on timer that provides an enabling switch control signal at an output when the threshold detector detects the vehicle engine is on; and
  a power switch controlled by the output of the on timer, wherein the on timer continues to provide an enabling signal to the power switch for a predetermined time after the threshold detector detect that the vehicle engine is turned off.

13. The vehicle cigarette lighter outlet switching circuit of claim 12, wherein the threshold detector provides a disabling signal to the power switch when the vehicle engine is off.

14. The vehicle cigarette lighter outlet switching circuit of claim 12, wherein the on timer continues to provide an enabling signal to the power switch for a predetermined time after the threshold detector detects that the vehicle engine is turned off.

15. The vehicle cigarette lighter outlet switching circuit of claim 14, wherein the vehicle cigarette lighter outlet switching circuit further comprises a switch coupled to the on timer that enables the a one shot timer included within the on timer to provide the enabling signal to the power switch for the predetermined time when the vehicle engine is turned off.

16. The vehicle cigarette lighter outlet switching circuit of claim 12, wherein the predetermined threshold is a range between 13.8 volts and 14.2 volts.

17. The vehicle cigarette lighter outlet switching circuit of claim 12, wherein the predetermined threshold is a calculated voltage that is derived from the voltages obtained when the engine is turned on and when the engine is turned off.

18. The vehicle cigarette lighter outlet switching circuit of claim 12, wherein the vehicle power outlet switch further comprises an indicator coupled to the on timer that indicates when the power switch is enabled.

19. The vehicle cigarette lighter outlet switching circuit of claim 12, wherein the vehicle cigarette lighter outlet switching circuit forms a part of at least one among a power cord for an external electronic accessory or the external electronic accessory itself.

* * * * *